(12) United States Patent
Jimenez et al.

(10) Patent No.: US 10,511,868 B2
(45) Date of Patent: Dec. 17, 2019

(54) PROVIDING SUPPLEMENTAL CONTENT FOR A MEDIA STREAM USING A MULTICAST SYSTEM

(71) Applicant: Verizon Patent and Licensing Inc., Arlington, VA (US)

(72) Inventors: Eduardo Jimenez, Santa Clara, CA (US); Rodrigo Meneses, Santa Clara, CA (US); Mahesh Kumar Vasanthusomashekar, Newark, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/885,392

(22) Filed: Jan. 31, 2018

(65) Prior Publication Data

US 2019/0238899 A1 Aug. 1, 2019

(51) Int. Cl.
| | |
|---|---|
| *H04N 21/237* | (2011.01) |
| *H04N 21/258* | (2011.01) |
| *H04N 21/222* | (2011.01) |
| *H04L 29/06* | (2006.01) |
| *H04N 21/44* | (2011.01) |
| *H04N 21/6405* | (2011.01) |
| *H04N 21/81* | (2011.01) |
| *H04N 21/845* | (2011.01) |

(52) U.S. Cl.
CPC ......... *H04N 21/237* (2013.01); *H04L 65/00* (2013.01); *H04N 21/222* (2013.01); *H04N 21/25841* (2013.01); *H04N 21/44008* (2013.01); *H04N 21/6405* (2013.01); *H04N 21/812* (2013.01); *H04N 21/8456* (2013.01)

(58) Field of Classification Search
CPC ............... H04N 21/237; H04N 21/222; H04N 21/25841
See application file for complete search history.

(56) References Cited

U.S. PATENT DOCUMENTS

| | | | | |
|---|---|---|---|---|
| 2009/0034545 | A1* | 2/2009 | Biggs | H04L 12/185 370/401 |
| 2010/0114948 | A1* | 5/2010 | Shrivastava | H04L 29/08729 707/770 |
| 2013/0046856 | A1* | 2/2013 | Joong | H04N 21/4316 709/219 |
| 2014/0259049 | A1* | 9/2014 | Wang | H04N 21/812 725/32 |

* cited by examiner

*Primary Examiner* — Sumaiya A Chowdhury

(57) ABSTRACT

An example includes monitoring a media stream for a break of the media stream, the media stream being received by a media client; detecting the break of the media stream, where detection of the break indicates that supplemental content is to be provided during the break; sending a request for supplemental content information to a supplemental content server; receiving the supplemental content information for the break from the supplemental content server, the supplemental content information being based on the location of the media client; streaming the supplemental content to the media client within a supplemental content stream; and sending a notification to the media client, the notification including information that enables the media client to access the supplemental content stream during the break of the media stream based on the notification.

20 Claims, 6 Drawing Sheets

PROVIDING SUPPLEMENTAL CONTENT FOR A MEDIA STREAM USING A MULTICAST SYSTEM

BACKGROUND

Streaming media (e.g., video streaming) involves delivering content and continually presenting the content to an end-user. A media stream can include a live stream, a look-up stream, and/or the like. In a live stream, content is provided to a destination device without saving the content (e.g., using memory resources). In a look-up stream, content can be saved and/or buffered (e.g., temporarily stored) in a look-up storage prior to being provided to a destination device.

DETAILED DESCRIPTION OF PREFERRED EMBODIMENTS

Figure 1A:
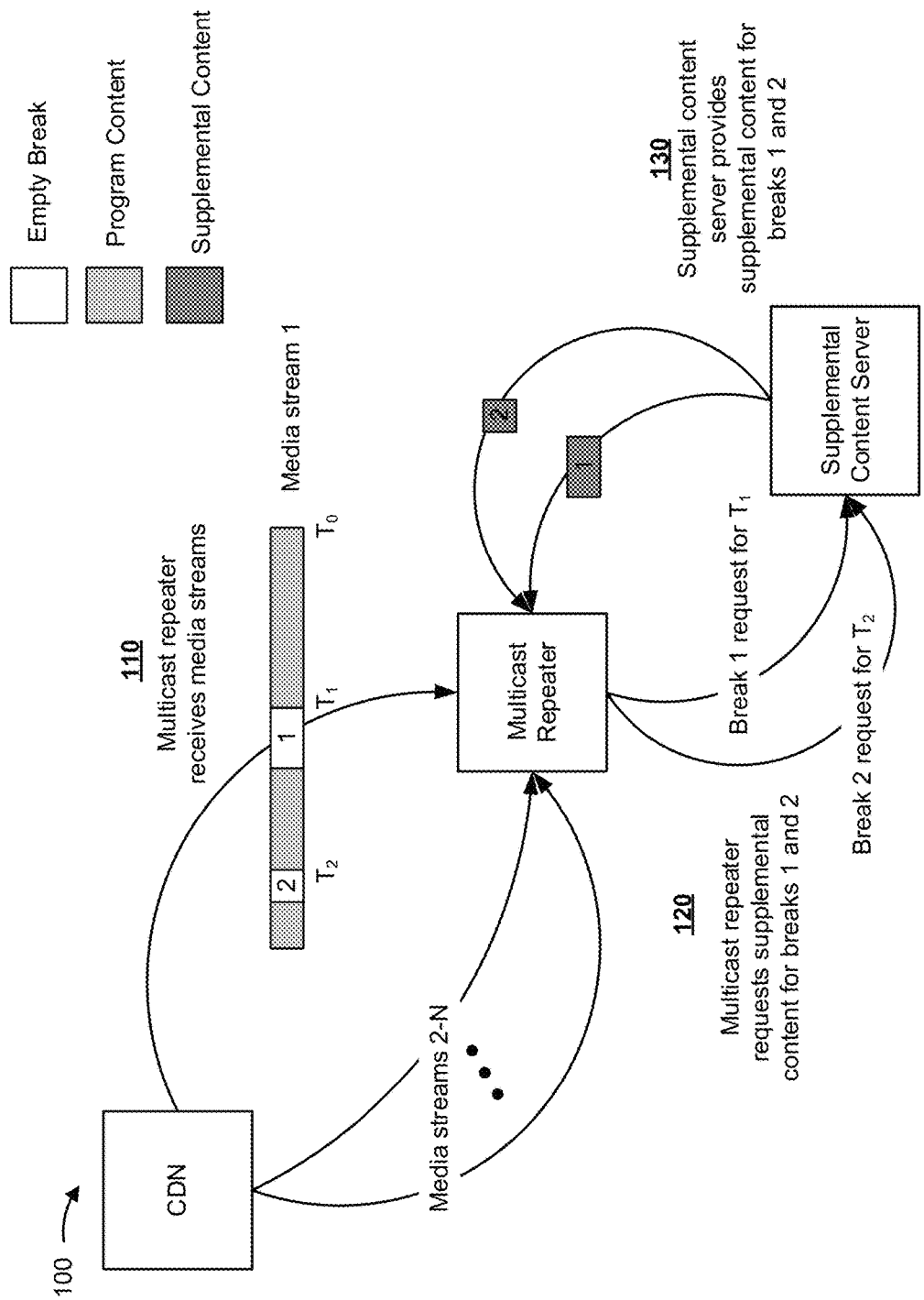
FIGS. 1A and 1B are diagrams of an overview of an example implementation described herein.

The following detailed description of example implementations refers to the accompanying drawings. The same reference numbers in different drawings can identify the same or similar elements.

In many instances, a supplemental content server provides supplemental content (e.g., metadata associated with the media stream, graphics content associated with the media stream, advertising content, and/or the like) to one or more media clients that are accessing a media stream (e.g., that are streaming media). For example, while accessing a media stream (e.g., receiving the media stream, opening the media stream, presenting content of the media stream, and/or the like), a media client can request (e.g., based on detecting a society of cable and telecommunication engineers (SCTE) 35 (SCTE35) message in the media stream) a supplemental content server to provide supplemental content for insertion within a media stream. In such cases, based on receiving a request for supplemental content, the supplemental content server can provide (e.g., stream, transmit, and/or the like) the supplemental content to the media client. In many instances, with multiple media clients (e.g., thousands or millions of media clients) accessing a same media stream, the supplemental content server can overload a network and/or become overloaded with providing multiple streams of supplemental content or multiple instances of the supplemental content for breaks.

According to some implementations described herein, a multicast repeater that is multicasting a media stream (or multiple media streams) to media clients can request supplemental content from the supplemental content server. For example, the multicast repeater can request the supplemental content from the supplemental content server when there is a break in the media stream (e.g., which can be detected via a cueing message). In such instances, the supplemental content server can provide the requested supplemental content for the break to the multicast repeater to enable the multicast repeater to multicast a supplemental content stream that includes the supplemental content, to the media clients. As such, media clients accessing the multicast media stream and the supplemental content stream can perform supplemental content insertion by switching between the media stream when program content is to be streamed and the supplemental content stream when supplemental content is to be streamed.

In some implementations, described herein, because the multicast repeater can be nearer the media clients (e.g., closer to the edge of the network to which the media clients are connected) than the supplemental content server (e.g., physically closer and/or logically closer within a network), network resources between the supplemental content server and the multicast repeater can be conserved as the supplemental content server transmits the supplemental content to the multicast repeater, rather than to multiple media clients accessing the media stream via the multicast repeater. Furthermore, computing resources of the supplemental content server can be conserved as a single request can be received for supplemental content of a media stream from the multicast repeater, rather than multiple requests for supplemental content from multiple media clients that are accessing the media stream via the multicast repeater.

Figure 1B:
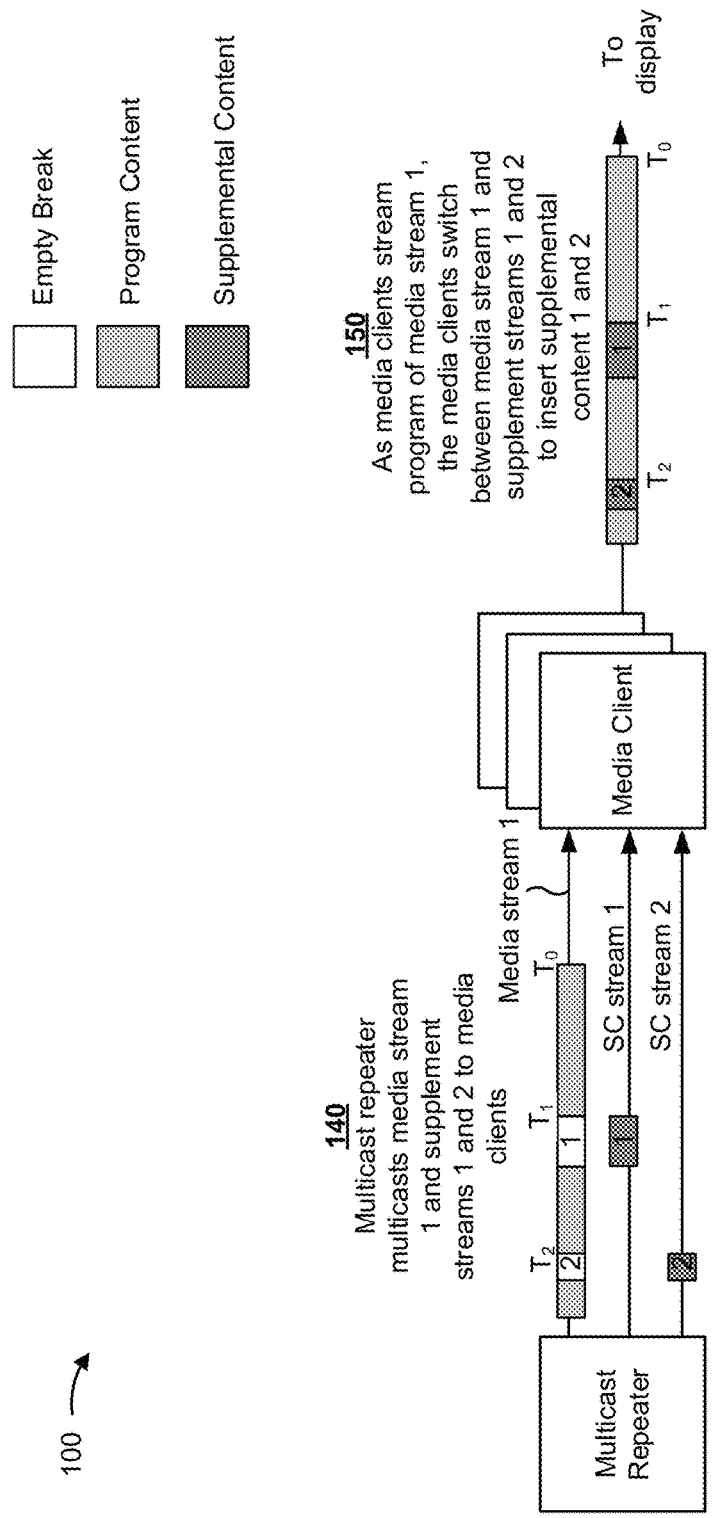

FIGS. 1A and 1B are diagrams of an overview of an example implementation 100 described herein. In FIGS. 1A and 1B, a multicast repeater enables supplemental content to be provided via multicast supplemental content streams, as described herein.

As shown in FIG. 1A, and by reference number 110, the multicast repeater receives N media streams (where N is an integer that is greater than 1) from a content delivery network (CDN). As shown, media stream 1 of the N media streams includes a stream of program content that includes breaks at times $T_1$ and $T_2$, which are shown in example implementation 100 as break 1 and break 2. As shown by reference number 120, the multicast repeater requests supplemental content for break 1 and break 2. In example implementation 100 of FIG. 1A, the multicast repeater can send a request for the supplemental content for break 1 and a request for the supplemental content for break 2 as the multicast repeater detects break 1 and break 2 at time $T_1$ and time $T_2$, respectively (e.g., based on a detecting or receiving cueing messages for breaks 1 and 2).

As further shown in FIG. 1A, and by reference number 130, the supplemental content server provides supplemental content 1 and supplemental content 2 for break 1 and break 2, respectively. As shown, the supplemental content server can provide supplemental content 1 and supplemental content 2 in separate responses to the multicast repeater. For example, the supplemental content server can provide supplemental content 1 based on receiving the request for supplemental content at or near time $T_1$ of media stream 1 and can provide supplemental content 2 based on receiving the request for supplemental content at or near time $T_2$ of media stream 1. In some implementations, supplemental content 1 and/or supplemental content 2 can be provided via a same communication link that is between the multicast repeater and the supplemental content server. For example, the communication link can be a dedicated communication link of a network that enables the multicast repeater to obtain supplemental content from the supplemental content server.

As shown in FIG. 1B, and by reference number 140, the multicast platform multicasts media stream 1, supplemental content stream 1 (shown as SC stream 1), and supplemental content stream 2 (shown as SC stream 1 and SC stream 2) to media clients accessing media stream 1. As shown, SC stream 1 and SC stream 2 include supplemental content 1 and supplemental content 2, respectively. As shown, supplemental content stream 1 includes supplemental content 1, which is provided (e.g., multicasted, streamed, and/or the like) at time $T_1$, and supplemental content stream 2 includes supplemental content 2, which is provided at time $T_2$. In some implementations, supplemental content 1 and supplemental content 2 can be provided within a same supplemental content stream. For example, because supplemental content 1 and supplemental content 2 are provided at different times, the multicast repeater can reuse supplemental content stream 1 or supplemental content stream 2 to multicast both supplemental content 1 and supplemental content 2.

As further shown in FIG. 1B, and by reference number 150, as the media clients stream the program content of media stream 1, the media clients switch between media stream 1 and the supplemental content streams 1 and 2 to insert supplemental content 1 and supplemental content 2. For example, as shown, at time $T_1$, the media client can switch the multicast stream that the media client is accessing from media stream 1 to supplemental content stream 1. After supplemental content 1 of supplemental content stream 1 is accessed (e.g., received, processed, and/or caused to be displayed (or displayed)) by the media clients, the media clients can switch back to media stream 1 until time $T_2$, when the media clients switch to supplemental content stream 2 to access supplemental content 2. After supplemental content 2 of supplemental content stream 2 is streamed, the media clients can switch back to media stream 1. In some implementations, the multicast repeater can instruct the media client to switch the supplemental content streams by identifying which of the supplemental content streams are to be accessed at which breaks of the media stream.

In some implementations, multiple streams (e.g., the media stream 1 and the supplemental content stream 1, or the media stream 1 and the supplemental content stream 2) can be accessed simultaneously by the media clients. For example, if supplemental content 1 includes metadata and/or a banner advertisement that is to be overlaid over program content of media stream 1, both program content of the media stream and supplemental content 1 can be accessed by the media clients simultaneously.

As such, an example multicast repeater can enable multicast supplemental content insertion by obtaining supplemental content from a supplemental content server and multicasting supplemental content streams that include the supplemental content. As such, the multicast repeater and/or the supplemental content server can conserve network resources between the multicast repeater and the supplemental content server and computing resources of the supplemental content server by limiting the number of times the supplemental content is to be provided by the supplemental content server and by limiting the number of requests for supplemental content that are to be made to supplemental content server.

As indicated above, FIGS. 1A and 1B are provided merely as an example. Other examples are possible and can differ from what was described with regard to FIGS. 1A and 1B. For example, for each media stream that is multicast by the multicast repeater of example implementation 100, the multicast repeater can obtain supplemental content and multicast the supplemental content via a supplemental content stream.

Figure 2:
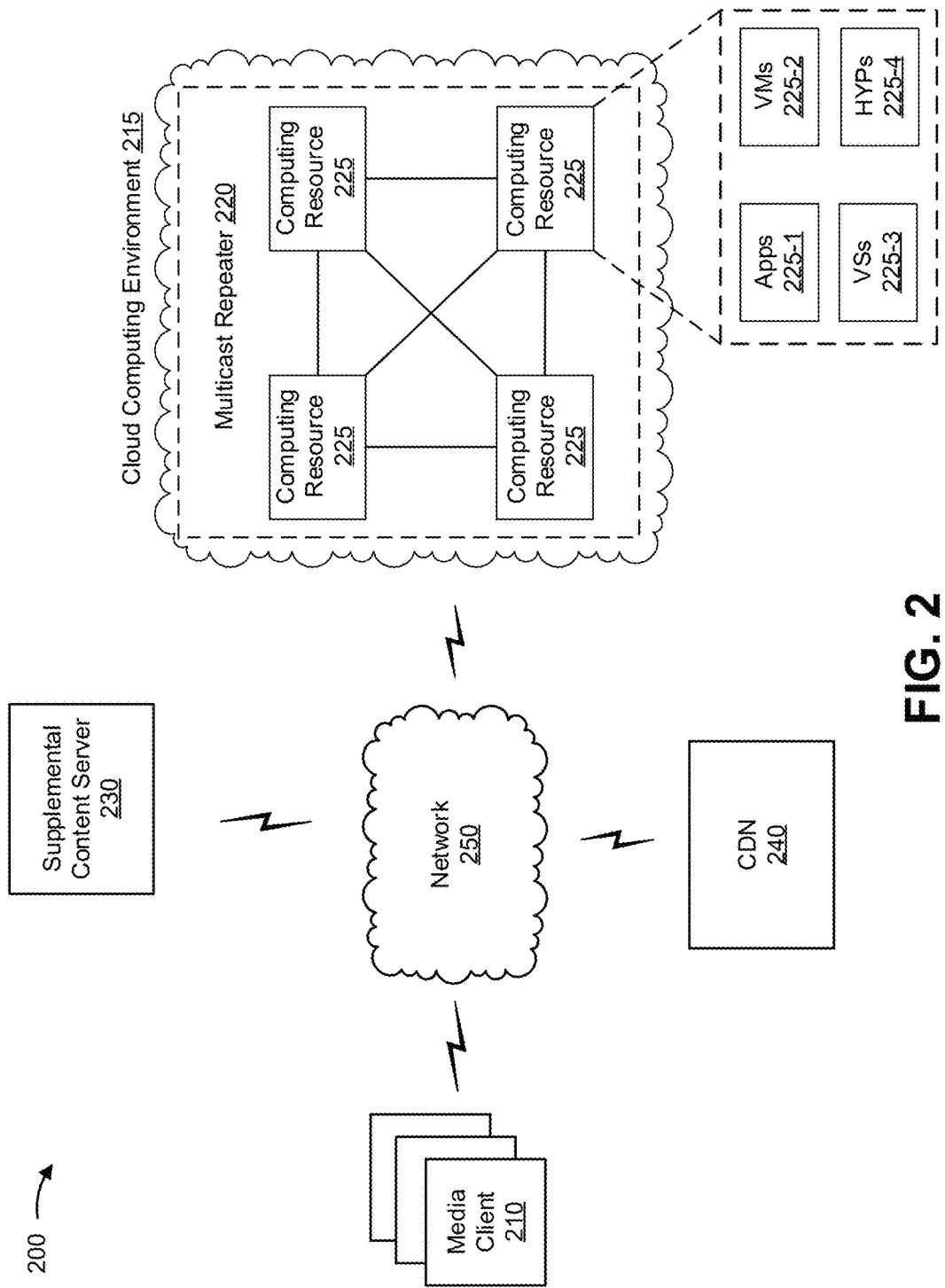
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more media clients 210 (which can be referred to individually as "media client 210" or collectively as "media clients 210"), a cloud computing environment 215 hosting a multicast repeater 220, a supplemental content server 230, a CDN 240, and a network 250. Devices of environment 200 can interconnect via wired connections, wireless connections, or a combination of wired and wireless connections.

Media client 210 includes a device capable of receiving, transmitting, and/or processing multimedia content and providing the multimedia content to a user (e.g., via a display device). Examples of media client 210 can include a smartphone, a set-top box, a casting stick (e.g., a high-definition media interface (HDMI) dongle), a computer, a tablet, a cable card, a gaming device, a portable electronic device, and/or other types of devices capable of receiving, transmitting, and/or processing multimedia content and providing the multimedia content to a user. According to some implementations, media client 210 can access multicast media streams and/or supplemental content streams from multicast repeater 220.

Cloud computing environment 215 includes an environment that delivers computing as a service, whereby shared resources, services, etc. can be provided to multicast media streams and/or supplemental content streams. Cloud computing environment 215 can provide computation, software, data access, storage, and/or other services that do not require end-user knowledge of a physical location and configuration of a system and/or a device that delivers the services. As shown, cloud computing environment 215 can include a multicast repeater 220 and a computing resource 225.

Multicast repeater 220 includes one or more devices capable of receiving, providing, storing, generating, and/or processing content (e.g., including program content and supplemental content) to be provided to media clients 210. In some implementations, multicast repeater 220 can utilize computing resource 225 as a repeater, a transceiver (or separate transmitter and receiver), an amplifier, a server device, and/or a similar type of device. In some implementations, multicast repeater 220 can receive content from supplemental content server 230 (e.g., supplemental content) and/or a media stream from CDN 240 (e.g., that includes program content). As described herein, multicast repeater can multicast one or more media streams and/or one or more supplemental content streams (e.g., simultaneously) in accordance with some implementations described herein.

Computing resource 225 includes one or more personal computers, workstation computers, server devices, or another type of computation and/or communication device. In some implementations, computing resource 225 can host multicast repeater 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by media client 210. Application 225-1 can eliminate a need to install and execute the software applications on media client 210. For example, application 225-1 can include software associated with multicast repeater 220 and/or any other software capable of being provided via cloud computing environment 215. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., media client 210), and can manage infrastructure of cloud computing environment 215, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Supplemental content server 230 includes one or more devices capable of storing, processing, and/or routing information associated with supplemental content. In some implementations, supplemental content server 230 can include a communication interface that allows supplemental content server 230 to receive information from and/or transmit information to other devices in environment 200. For example, supplemental content server 230 can receive requests for supplemental content and/or supplemental content information (e.g., from multicast repeater 220 and/or can provide supplemental content and/or supplemental content information (e.g., to multicast repeater 220). According to some implementations, supplemental content server 230 can provide supplemental content to multicast repeater 220 that is to be multicast to media client 210 within one or more supplemental content streams.

CDN 240 includes one or more server devices (e.g., content servers) or one or more groups of server devices within one or more wired and/or wireless networks. For example, CDN 240 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 240 can provide program content of one or more media streams to media client 210.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
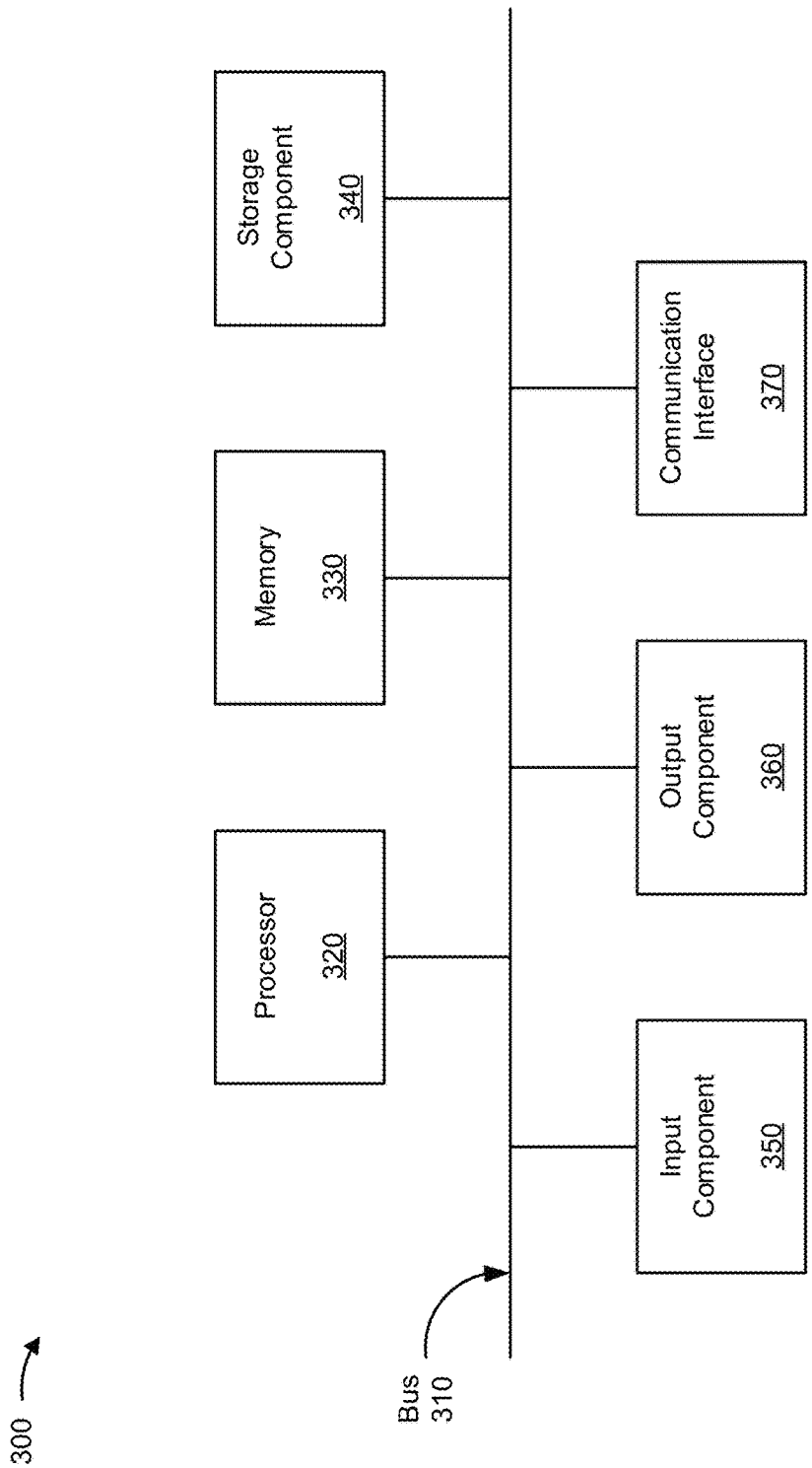
FIG. 3 is a diagram of example components of one or more devices of FIG. 2.

FIG. 3 is a diagram of example components of a device 300. Device 300 can correspond media client 210, computing resource 225, supplemental content server 230, and/or CDN 240. In some implementations media, client 210, supplemental content server 230, and/or CDN 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
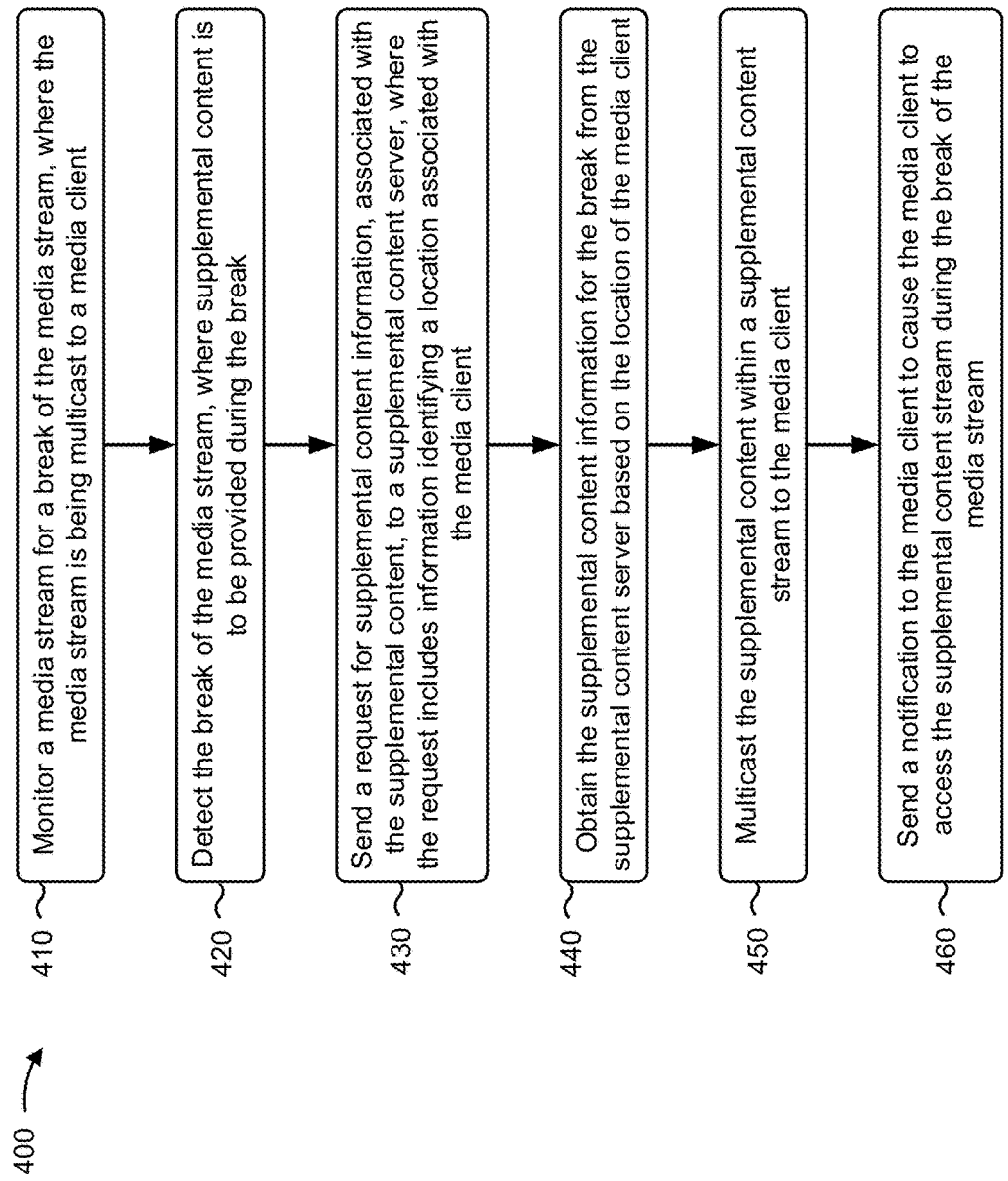
FIG. 4 is a flow chart of an example process for providing supplemental content for a media stream using a multicast system.

FIG. 4 is a flow chart of an example process 400 for providing supplemental content for a media stream using a multicast system. In some implementations, one or more process blocks of FIG. 4 can be performed by a multicast repeater 220. In some implementations, one or more process blocks of FIG. 4 can be performed by another device or a group of devices separate from a multicast repeater 220 or including an such as a media client 210, a supplemental content server 230, and a CDN 240.

As shown in FIG. 4, process 400 can include monitoring a media stream for a break of the media stream, where the media stream is being multicast to a media client (block 410). For example, multicast repeater 220 can monitor a media stream that is received from CDN 240 and the multicast repeater 220 is multicasting to media client 210. In some implementations, multicast repeater 220 can monitor a media stream for a break based on receiving the media stream from CDN 240, based on media client 210 requesting access to the media stream, based on multicasting the media stream to media client 210, and/or the like.

In some implementations, media client 210 can request to access a media stream that is multicast by multicast repeater 220. In such cases, the request to access the media stream can include a message or notification indicating that media client 210 seeks to access (e.g., receive, process, stream, cause to be displayed, and/or the like) the media stream. In some implementations, the request can include one or more characteristics of media client 210. For example, the request can include subscription information associated with a media service provider associated with CDN 240, an identifier (e.g., a stream identifier, a channel number, a media network identifier, a program identifier, and/or the like), a time of the request, location information indicating a location of media client 210, and/or the like.

In some implementations, the media stream can include a continuous set of data that includes content (e.g., media content) accessible via media client 210. In some implementations, the content can include video, audio, text, an image, and/or the like. In some implementations, the content can include live content (e.g., live video, provided in real-time or near real-time), look-up content (e.g., catch-up content, stored content, and/or the like), on demand content, and/or the like. In some implementations, the content can include one or more packets. In some implementations, a packet (e.g., of the one or more packets) can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted or received from supplemental content server 230, and/or CDN 240. In some implementations, at least a portion of the content can include a segment, a chunk, and/or the like.

Multicast repeater 220 can monitor the media stream for the break by being configured to detect the break. For example, multicast repeater 220 can be configured to detect or identify a cueing message (e.g., an SCTE35 message) associated with the break. In some implementations, multicast repeater 220 can detect the cueing message as multicast repeater 220 receives, processes, analyzes and/or multicasts the media stream. As such, multicast repeater 220 can use any suitable techniques to monitor the media stream for the break.

In some implementations, multicast repeater 220 can multicast the media stream to a plurality of media clients 210 using a repeater or any other type multicasting device or technique, such that the media stream can be accessed by the plurality of media clients 210 and each one of media clients 210 may access multiple media streams (e.g., simultaneously or sequentially) from multicast repeater 220. Multicast repeater 220 can use any suitable techniques or protocols for multicasting one or more media streams. For example, media client 210 can request multicast repeater 220 to enable access to the media stream via a communication link that can be used to access and/or provide the media stream.

In this way, multicast repeater 220 can monitor the media stream to permit multicast repeater 220 to detect the break.

As further shown in FIG. 4, process 400 can include detecting the break of the media stream, where supplemental content is to be provided during the break (block 420). For example, multicast repeater 220 can detect the break of the media stream. In some implementations, multicast repeater 220 can detect the break based on receiving the media stream from CDN 240, based on monitoring the media stream, based on identifying an indicator of the break (e.g., a cueing message), and/or the like.

In some implementations, a break can include a section or chunk of the media stream that is designated for supplemental content. For example, the break can be between sections of program content. In some implementations, the break can occur at the beginning or end of a program time slot. For example, a program time slot can be a time period during which a program is scheduled to be streamed (e.g., via a unicast or multicast stream). A program may be scheduled to be streamed according to a schedule of a service provider and/or according to a schedule for allocating broadcast spectrum or allocating a media stream for streaming the program. In some implementations, a program can be scheduled to be streamed during a program time slot that is based on a time of a request for the stream.

In some implementations, detection of a cueing message can indicate the presence of a break. For example, the cueing message can be included within the media stream (e.g., within or between program content) before the break is to occur. For example, the cueing message may be provided via the media stream a threshold period of time before the break is to occur. In some implementations, the cueing message can be included within the media stream 10 seconds, 30 seconds, 1 minute, and/or the like before the break is to occur.

According to some implementations, supplemental content is to be provided during the break. For example, the supplemental content can be provided via a supplemental content stream as described herein. As used herein, content can be program content or supplemental content. As used herein, program content is provided via a media stream and can include content produced by a media company, a media network, a media broadcast company, and/or the like. For example, program content can include video, audio, text, an image, and/or the like for a television program, a movie, a televised sporting event, a newscast, a podcast, a niche streaming, a hosted or shared video/audio file, an event cinema, a livecast, a video game, and/or the like. Supplemental content can include metadata (e.g., data to cause an action associated with the media stream), graphics content associated with the media stream (e.g., image content or video content that is to be overlaid over the media stream), advertising content (or ad content), and/or the like. As such, supplemental content can be produced or associated with an advertisement agency, media company, media network, media broadcast company, and/or the like for the purpose of advertising a brand, a product, program content, and/or the like. For example, supplemental content can include video, audio, text, an image, and/or the like for a commercial, a preview, a banner advertisement, a public service announcement, an endorsement, an advertorial, and/or the like.

Accordingly, multicast repeater 220 can monitor the media stream for the break by being configured to detect a cueing message for the break. For example, multicast repeater 220 can detect or identify the cueing message by receiving, processing, and/or analyzing the media stream to detect the cueing message.

In this way, multicast repeater 220 can detect a break of the media stream to permit multicast repeater 220 to obtain supplemental content.

As further shown in FIG. 4, process 400 can include sending a request for supplemental content information, associated with the supplemental content, to a supplemental content server, where the request includes information identifying a location associated with the media client (block 430). For example, multicast repeater 220 can send the request to supplemental content server 230. In some implementations, multicast repeater 220 can send the request based on detecting the break of the media stream.

In some implementations, a request for supplemental content information can include a message or notification. In some implementations, the request can include one or more characteristics of media client 210 (e.g., subscription information associated with a media service provider associated with CDN 240, location information, and/or the like), an identifier (e.g., a stream identifier, a channel number, a media network identifier, a program identifier, and/or the like), a time of the request, a time period of the break, and/or the like.

As used herein, supplemental content information can include information associated with supplemental content (e.g., identification information, supplemental content source information, sequence information for a sequence of sets of supplemental content in the break, and/or the like) and/or data of the supplemental content, itself. In some implementations, the supplemental content information can include information identifying supplemental content that is to be provided during the breaks in the media stream (e.g., breaks between program content).

The supplemental content information can include instructions to enable multicast repeater 220 to provide the supplemental content to media client 210. For example, the supplemental content information can include information identifying an available stream (e.g., which can be identified by a frequency, a channel number, an identifier, and/or the like) of multicast repeater 220 that is to be used to multicast a supplemental content stream to media client 210. As such, multicast repeater 220 can multicast supplemental content via the available stream to form a supplemental content stream that is multicast to media client 210 (e.g., in parallel with the media stream). In some implementations, multicast repeater 220 can establish the supplemental content stream and/or allocate the stream for the supplemental content prior to a beginning of the break of the media stream.

In some implementations, the supplemental content information is associated with advertisements (or "ads") that are to be included within the break. For example, the supplemental content information can include video multiple advertisement playlist (VMAP) information and video advertisement serving template (VAST) information. For example, the VMAP information can include information associated with one or more breaks of the media stream and the VAST information can include information associated with one or more ads of each break of the media stream. Accordingly, the supplemental content information can include supplemental content data and/or instructions for obtaining (e.g., downloading) supplemental content data.

In some implementations, multicast repeater 220 can generate the request for supplemental content based on a location associated with media client 210. For example, the request can be generated to include location information to indicate a location, a local zone, and/or a region of media client 210 and/or multicast repeater 220. An example region can include one or more of a city, a metropolitan area, a county, a state, a country, or any other geographical region within which media client 210 and/or multicast repeater 220 are located. As described herein, a region can include one or more local zones. As such, multicast repeater 220 can request the supplemental content server 230 to provide supplemental content that is based on the location, local zone, and/or region of media client 210 and/or multicast repeater 220.

In some instances, media client 210 and/or multicast repeater 220 are to provide supplemental content during a break of the media stream based on a local zone and/or region associated with media client 210. According to some implementations, based on the request for the supplemental content information, supplemental content server 230 identifies a designated or allocated supplemental content break to be provided during the break of the media stream for the indicated local zone or region of media client 210 and/or multicast repeater 220. The supplemental content break is representative of supplemental content to be provided during the breaks of the media stream. The supplemental content break can include one or more content slots that are to include sets of supplemental content (e.g., that can correspond to ads, sets of metadata, and/or the like) that are to be provided during the break of the media stream. For example, the supplemental content break can include supplemental content that is based on a local zone and/or region associated with media client 210 and/or multicast repeater 220 (e.g., a local zone or region from where media client 210 sent the request, a local zone and/or a region designated as a home region of media client 210 (e.g., which can be based on a residence of a user associated with media client 210)).

Accordingly, upon receipt of a request for supplemental content information, supplemental content server 230 can determine the local zone and/or region corresponding to a location of media client 210 (which can be provided in the request). Supplemental content server 230 can then identify a supplemental content break corresponding to the local zone and/or region and generate supplemental content information corresponding to the supplemental content break. As such, the supplemental content information can include local zone supplemental content information corresponding to the local zone and/or regional supplemental content information corresponding to the region of media client 210. In some implementations, when supplemental content server 230 provides both local zone supplemental content information and regional supplemental content information for a content slot of a supplemental content break, multicast repeater 220 can include the local zone supplemental content (e.g., by default) within the supplemental content slot of the supplemental content stream. Additionally, or alternatively, if local zone supplemental content information is not provided for a content slot of a supplemental content break and regional supplemental content is provided for the same content slot of the supplemental content break, multicast repeater 220 can insert regional supplemental content in the content slot (i.e., local zone supplemental content is to be inserted over regional supplemental content if the local zone supplemental content is provided) of the supplemental content stream. Accordingly, supplemental content server 230 can provide the appropriate supplemental content information to multicast repeater 220 based on location information received in the request from multicast repeater 220.

Multicast repeater 220 can send the request to supplemental content server 230 using any suitable techniques or protocols. In some implementations, multicast repeater 220 can request supplemental content information via a communication that can be used to receive the supplemental content information and/or the supplemental content. In such implementations, multicast repeater 220, when sending the request, can send and/or receive one or more communications (e.g., according to suitable techniques or protocols) to establish the communication link to request the supplemental content information.

In this way, multicast repeater 220 can send a request for supplemental content information to a supplemental content server to permit multicast repeater 220 to obtain supplemental content information.

As further shown in FIG. 4, process 400 can include obtaining the supplemental content information for the break from the supplemental content server based on the location of the media client (block 440). For example, multicast repeater 220 can obtain the supplemental content information from supplemental content server 230. In some implementations, multicast repeater 220 can obtain the supplemental content information based on sending the request for the supplemental content information for the break of the media stream.

In some implementations, multicast repeater 220 can obtain the supplemental content information from supplemental content server 230 via a communication link that can be used to access and/or receive the supplemental content information. As such, supplemental content server 230, when sending the supplemental content information, can send and/or receive one or more communications (e.g., according to suitable techniques or protocols) to establish the communication link to provide the supplemental content information to media client 210.

In some implementations, multicast repeater 220 analyzes the supplemental content information to determine how supplemental content is to be provided during the break of the media stream. For example, multicast repeater 220 can determine that the supplemental content information includes instructions for providing supplemental content via a supplemental content media stream. For example, the instructions can identify which stream (e.g., that is available during the break) of the multicast repeater 220 is to be used to provide the supplemental content. Accordingly, the instructions can include an identifier (e.g., a channel number, a frequency, a stream name, a stream number, and/or the like) to indicate that the multicast repeater 220 is to provide the supplemental content via the stream. In such cases, the allocated stream can then become a supplemental content stream that is multicast to media client 210, as described herein.

In some implementations, instructions of the supplemental content information can further include instructions regarding a sequence for multicast repeater 220 to stream the supplemental content for the break (e.g., via VMAP information), instructions for timing the streaming of the supplemental content, instructions for obtaining (e.g., downloading) the supplemental content, instructions for accessing a stream (e.g., a multicast stream) including the supplemental content, and/or the like. In some implementations, the supplemental content information can include instructions for multiple local zones of a region. For example, if multicast repeater 220 is a repeater that is capable of providing supplemental content for multiple local zones of a region, the supplemental content information can include instructions for providing supplemental content within the respective local zones. As mentioned above, supplemental content information can include supplemental content data, and therefore, when multicast repeater 220 obtains the supplemental content information, multicast repeater 220 can obtain supplemental content, itself.

In this way, multicast repeater 220 can obtain the supplemental content information to permit multicast repeater 220 to multicast the supplemental content to media client 210.

As further shown in FIG. 4, process 400 can include multicasting the supplemental content within a supplemental content stream to the media client (block 450). For example, multicast repeater 220 can multicast the supplemental content to media client 210 via a supplemental content stream. In some implementations, multicast repeater 220 can multicast the supplemental content based on obtaining the supplemental content information.

According to some implementations, multicast repeater 220 multicasts the supplemental content within a supplemental content stream by transmitting the supplemental content to media client 210 in a continuous stream. Multicast repeater 220 can multicast the supplemental content using any suitable techniques. For example, multicast repeater 220 can multicast a plurality of media streams to media client 210 via a same communication link. The plurality of media streams can be distinguishable based on any suitable coding techniques and/or modulation techniques.

In some implementations, multicast repeater 220 can multicast the supplemental content based on a location of media client 210. For example, if multicast repeater 220 is a multicast repeater 220 for a region that is capable of streaming supplemental content to multiple local zones, multicast repeater 220 can identify the local zone of media client 210 and provide supplemental content that is designated to be provided during the break of the media stream when streamed in that local zone. As such, a first media client 210 in a first local zone can access a first supplemental content stream to access first supplemental content and a second media client 210 in a second local zone can access a second supplemental content stream to access second supplemental content.

Accordingly, multicast repeater 220 can multicast the supplemental content to media client 210 within a supplemental content stream. In some implementations, the supplemental content stream can be established and/or set up prior to streaming the actual supplemental content within the stream. For example, multicast repeater 220 can establish the supplemental content stream within a communication link with media client 210 such that the multicast repeater 220 can be available to stream the supplemental content via the supplemental content stream during the break of the media stream. Accordingly, multiple streams (a media stream and a supplemental content stream) can be established to enable multicast repeater 220 to provide content to media client 210. As such, to access the content of each stream, media client 210 can switch between processing and/or displaying the content of each of the streams.

In this way, multicast repeater 220 can multicast the supplemental content via a supplemental content stream to permit multicast repeater 220 to provide the supplemental content to media client 210.

As further shown in FIG. 4, process 400 can include sending a notification to the media client to cause the media client to access the supplemental content stream during the break of the media stream (block 460). For example, multicast repeater 220 can send the notification to media client 210 to cause media client 210 to switch to the supplemental content stream during the break. In some implementations, multicast repeater 220 can send the notification based on multicasting the supplemental content in the supplemental content stream, based on detecting the break of the media stream is about to begin (e.g., based on a cueing message in the media stream), based on timing instructions in the supplemental content information, and/or the like.

The notification can include a message (e.g., similar to a cueing message) that causes media client 210 to switch from the media stream to the supplemental content stream during the break. For example, multicast repeater 220 can generate the notification to include timing information (e.g., indicating a time at which media client is to switch to the supplemental content stream), an identifier of the supplemental content stream information (e.g., to enable media client 210 to identify which supplemental content stream is to be accessed), and/or the like. In such cases, multicast repeater 220 can provide the timing information and/or the supplemental content stream information based on the supplemental content information from supplemental content server 230. For example, the supplemental content information can include the timing information and/or information identifying which stream is to be allocated as the supplemental content stream.

According to some implementations, multicast repeater 220 sends the notification to media client 210, to cause media client 210 to switch to the supplemental content stream prior to the break beginning. For example, multicast repeater 220, based on detecting the break (and/or detecting timing of the break of the media stream), can send the notification to media client 220 a threshold period of time (e.g., 1 second, 5 seconds, and/or the like) before the break is to begin. In some implementations, multicast repeater can send the notification within the media stream that is being multicast to media client 210. As such, media client 210 can detect or receive the notification while processing the media stream.

In some implementations, multicast repeater 220 can send a notification to media client 210 to switch back to the media stream after the break. For example, multicast repeater 220 can include the notification within the supplemental content stream, so that when media client 210 detects the notification while processing the supplemental content of the supplemental content stream, media client 210 can switch back to the media stream. Additionally, or alternatively, multicast repeater 220 can include the instructions in the notification to switch from the media stream to the supplemental content stream. For example, multicast repeater 220 can provide instructions to media client 210 to switch to the supplemental content stream for a period of time that corresponds to the break and/or the supplemental content break for the break.

In this way, multicast repeater 220 can send a notification to cause media client 210 to access and/or receive supplemental content during a break of a media stream by accessing a multicasted supplemental content stream during the break.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
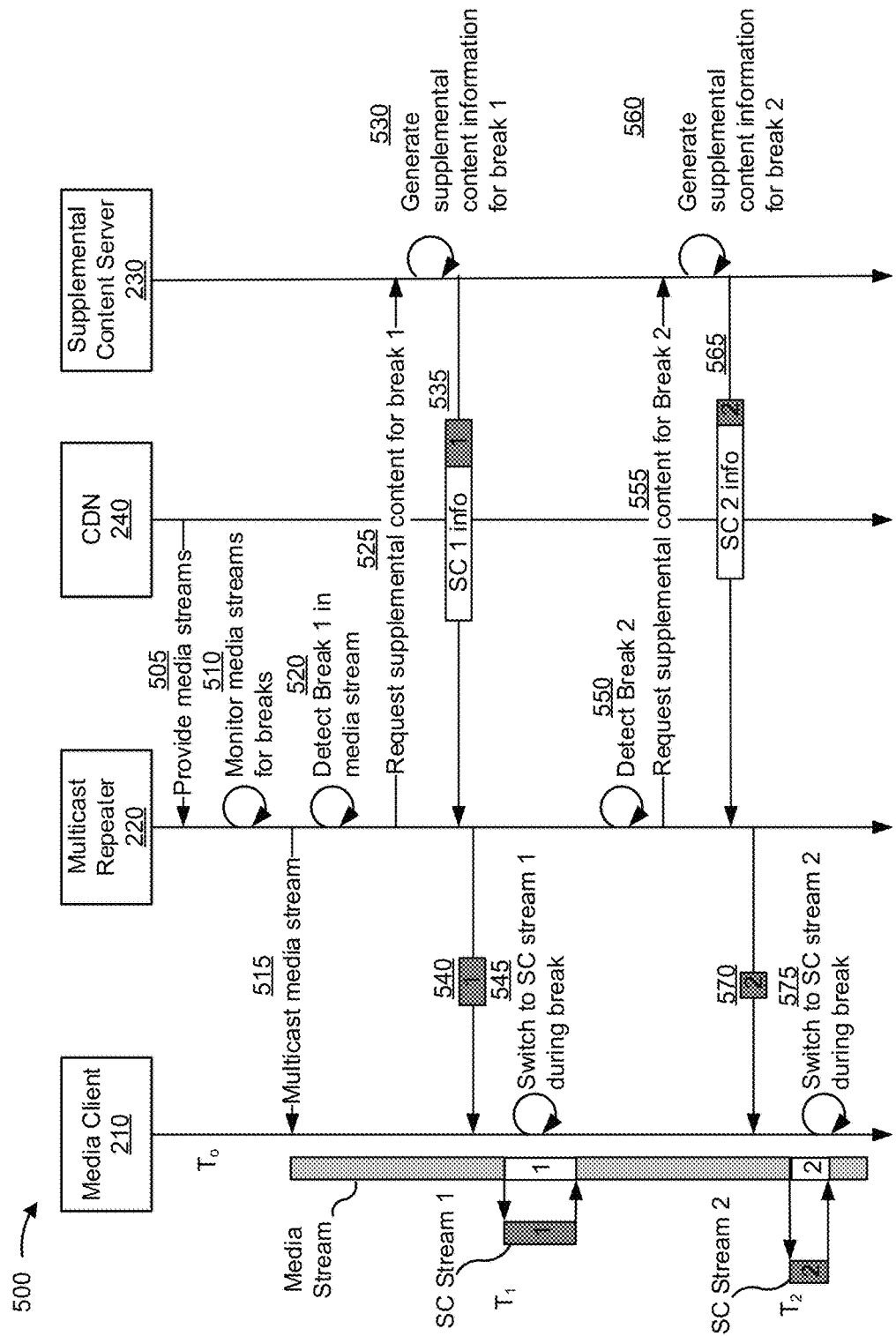
FIG. 5 is a diagram of an example implementation relating to the example process shown in FIG. 4.

FIG. 5 is a call flow diagram of an example call flow 500 for providing supplemental content for a media stream using a multicast system. As shown, call flow 500 includes an example of communications between media client 210, multicast repeater 220, supplemental content server 230, and CDN 240. It is noted, that although a single media client 210 is shown in FIG. 5, a call flow 500 of communications between multiple (e.g., thousands or millions of) media clients 210 may similarly be simultaneously occurring with multicast repeater 220, supplemental content server 230 and CDN 240 for multiple different media streams and/or different supplemental content streams.

As shown in FIG. 5, and by reference number 505, CDN 240, at time $T_0$, provides media streams to multicast repeater 220. As shown by reference number 510, multicast repeater 220 monitors the media streams for breaks in the media streams. As shown by reference number 515, multicast repeater 220 multicasts a media stream to media client 210. In some implementations, as described herein, multicast repeater 220 can multicast a plurality of media streams to media client 210.

As further shown in FIG. 5, and by reference number 520, multicast repeater 220 detects a first break (shown as break 1) in the media stream. As shown by reference number 525, multicast repeater 220 requests supplemental content (and/or supplemental content information) for break 1. As shown by reference number 530, supplemental content server 230 generates supplemental content information (shown as SC 1 info) for break 1 and, as shown by reference number 535, provides supplemental content 1 and the supplemental content information to multicast repeater 220. As shown by reference number 540, multicast repeater 220 multicasts supplemental content stream 1 (shown as SC stream 1) to media client 210. As shown by reference number 545, at time $T_1$, media client 210 switches to SC stream 1 during break 1.

As shown further shown in FIG. 5, and by reference number 550, multicast repeater 220 detects a second break (shown as break 2) in the media stream. As shown by reference number 555, multicast repeater 220 requests supplemental content (and/or supplemental content information) for break 2. As shown by reference number 560, supplemental content server 230 generates supplemental content information (shown as SC 2 info) for break 2 and, as shown by reference number 565, provides supplemental content 2 and the supplemental content information to multicast repeater 220. As shown by reference number 570, multicast repeater 220 multicasts supplemental content stream 2 (shown as SC stream 2) to media client 210. As shown by reference number 575, at time $T_2$, media client 210 switches to SC stream 2 during break 2.

As indicated above, FIG. 5 is provided merely as an example. Other examples are possible and can differ from what was described with regard to FIG. 5.

Accordingly, as described herein, multicast repeater 220 can obtain and multicast supplemental content in a supplemental content stream to enable a media client 210 to switch between a media stream and the supplemental content stream to access supplemental content for a break of the media stream. As such, multicast repeater 220 can conserve network resources by preventing multiple requests to a supplemental content server 230 for supplemental content from multiple (e.g., thousands or millions of) media clients 210. Furthermore, multicast repeater 220 can conserve computing resources of supplemental content server 230, as the supplemental content server 230 can process and respond to a single request for supplemental content that is to be supplied to multiple media clients 210, rather than having to process and respond to multiple requests from the multiple media clients 210 for the supplemental content.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more memories; and one or more processors, communicatively coupled to the one or more memories, to:
  multicast a media stream to a plurality of media clients;
  monitor the media stream for a break of the media stream,
    the media stream being received by a media client of the plurality of media clients;
  detect the break of the media stream,
    where detection of the break indicates that supplemental content is to be provided during the break;
  send a request for supplemental content information to a supplemental content server,
    where the supplemental content information is associated with the supplemental content,
    where the request includes information identifying a location associated with the media client of the plurality of media clients,
    where the supplemental content information includes information identifying a multicast stream that is to be used as the supplemental content stream, and
    where the location associated with the media client of the plurality of media clients is based on a location of a multicast repeater that is streaming the media stream to the media client of the plurality of media clients;
  receive the supplemental content information for the break from the supplemental content server,
    the supplemental content information being based on the location of the media client of the plurality of media clients, and
    the supplemental content information being received from the supplemental content server via a dedicated communication link to enable the device to obtain the supplemental content for a media device associated with the media client of the plurality of media clients and at least one other media device associated with another media client of the plurality of media clients in a single request;
  identify location information associated with the supplemental content in the supplemental content information;
  stream the supplemental content to the media client of the plurality of media clients within a supplemental content stream based on the location information associated with the supplemental content,
    the supplemental content stream being multicast in parallel with the media stream; and
  send a notification to the media client of the plurality of media clients,
    the notification including information that enables the media client of the plurality of media clients to access the supplemental content stream during the break of the media stream based on the notification, and
    the notification including the information identifying the multicast stream,
      the information identifying the multicast stream enabling the media client of the plurality of media clients to access the supplemental content.

2. The device of claim 1, where the one or more processors, when detecting the break of the media stream, are to:
  detect a cueing message, associated with the break, in the media stream; and
  detect the break based on the cueing message.

3. The device of claim 1, where the supplemental content information for the break includes timing information associated with accessing the supplemental content during the break, and
  where the notification includes the timing information,
    the timing information enabling the media client of the plurality of media clients to access the supplemental content during the break.

4. The device of claim 1, where the supplemental content includes at least one of:
  advertising content,
  metadata associated with program content of the media stream, or
  graphics content associated with the media stream.

5. The device of claim 1, where the one or more processors are further to:
  detect a cueing message, associated with the break, in the media stream,
    where the one or more processors, when detecting the cueing message, associated with the break, in the media stream, are to detect the break after detecting the cueing message.

6. The device of claim 1, where the one or more processors are further to:
  allocate the supplemental content stream prior to a beginning of the break of the media stream.

7. The device of claim 1, where the notification including the information that enables the media client to access the supplemental content stream is a first notification; and
  where the one or more processors are further to:
    send a second notification to the media client to switch back to the media stream after the break.

8. A non-transitory computer-readable medium storing instructions, the instructions comprising:
  one or more instructions that, when executed by one or more processors, cause the one or more processors to:
    multicast a media stream to a plurality of media clients;
    monitor the media stream for a break of the media stream,
      the media stream being received by a media client of the plurality of media clients;
    detect the break of the media stream,
      where detection of the break indicates that supplemental content is to be provided during the break;
    send a request for supplemental content information to a supplemental content server,
      where the supplemental content information is associated with the supplemental content,
      where the request includes information identifying a location associated with the media client of the plurality of media clients,
      where the supplemental content information includes information identifying a multicast stream that is to be used as the supplemental content stream, and
      where the location associated with the media client of the plurality of media clients is based on a location of a multicast repeater that is streaming the media stream to the media client of the plurality of media clients;
    receive the supplemental content information for the break from the supplemental content server,
      the supplemental content information being based on the location of the media client of the plurality of media clients, and
      the supplemental content information being received from the supplemental content server via a dedicated communication link to enable the one or more processors to obtain the supplemental content for a media device associated with the media client of the plurality of media clients and at least one other media device associated with another media device associated with another media client of the plurality of media clients in a single request;
identify location information associated with the supplemental content in the supplemental content information;
stream the supplemental content to the media client of the plurality of media clients within a supplemental content stream based on the location information associated with the supplemental content,
the supplemental content stream being multicast in parallel with the media stream; and
send a notification to the media client of the plurality of media clients,
the notification including information that enables the media client of the plurality of media clients to access the supplemental content stream during the break of the media stream based on the notification, and
the notification including the information identifying the multicast stream,
the information identifying the multicast stream enabling the media client of the plurality of media clients to access the supplemental content.

9. The non-transitory computer-readable medium of claim 8, where the one or more instructions, that cause the one or more processors detect to the break of the media stream, cause the one or more processors to:
detect a cueing message, associated with the break, in the media stream; and
detect the break based on the cueing message.

10. The non-transitory computer-readable medium of claim 8, where the supplemental content information for the break includes timing information associated with accessing the supplemental content during the break, and
where the notification includes information identifying the timing information,
the information identifying the timing information enabling the media client of the plurality of media clients to access the supplemental content during the break.

11. The non-transitory computer-readable medium of claim 8, where the supplemental content includes at least one of:
advertising content,
metadata associated with program content of the media stream, or
graphics content associated with the media stream.

12. The non-transitory computer-readable medium of claim 8, wherein the one or more instructions, when executed by the one or more processors, further cause the one or more processors to:
detect a cueing message, associated with the break, in the media stream,
where the one or more instructions, that cause the one or processors to detect the cueing message, associated with the break, in the media stream, cause the one or more processors to detect the break after detecting the cueing message.

13. The non-transitory computer-readable medium of claim 8, wherein the one or more instructions, when executed by the one or more processors, further cause the one or more processors to:
allocate the supplemental content stream prior to a beginning of the break of the media stream.

14. The non-transitory computer-readable medium of claim 8, where the notification including the information that enables the media client to access the supplemental content stream is a first notification; and
wherein the one or more instructions, when executed by the one or more processors, further cause the one or more processors to:
send a second notification to the media client to switch back to the media stream after the break.

15. A method, comprising:
multicasting, by a device, a media stream to a plurality of media clients;
monitoring, by the device, the media stream for a break of the media stream,
the media stream being received by a media client of the plurality of media clients;
detecting, by the device, the break of the media stream,
where detection of the break indicates that supplemental content is to be provided during the break;
sending, by the device, a request for supplemental content information to a supplemental content server,
where the supplemental content information is associated with the supplemental content, and
where the request includes information identifying a location associated with the media client of the plurality of media clients,
where the supplemental content information includes information identifying a multicast stream that is to be used as the supplemental content stream, and
where the location associated with the media client of the plurality of media clients is based on a location of a multicast repeater that is streaming the media stream to the media client of the plurality of media clients;
receiving, by the device, the supplemental content information for the break from the supplemental content server,
the supplemental content information being based on the location of the media client of the plurality of media clients, and
the supplemental content information being received from the supplemental content server via a dedicated communication link to enable the device to obtain the supplemental content for a media device associated with the media client of the plurality of media clients and at least one other media device associated with another media client of the plurality of media clients in a single request;
identifying, by the device, location information associated with the supplemental content in the supplemental content information;
streaming, by the device, the supplemental content to the media client of the plurality of media clients within a supplemental content stream based on the location information associated with the supplemental content,
the supplemental content stream being multicast in parallel with the media stream; and
sending, by the device, a notification to the media client of the plurality of media clients,
the notification including information that enables the media client of the plurality of media clients to access the supplemental content stream during the break of the media stream based on the notification, and the notification including the information identifying the multicast stream,
   the information identifying the multicast stream enabling the media client of the plurality of media clients to access the supplemental content.

16. The method of claim 15, where the supplemental content information for the break includes timing information associated with accessing the supplemental content during the break, and
   where the notification includes information identifying the timing information,
      the information identifying the timing information enabling the media client of the plurality of media clients to access the supplemental content during the break.

17. The method of claim 15, where the supplemental content includes at least one of:
   advertising content,
   metadata associated with program content of the media stream, or
   graphics content associated with the media stream.

18. The method of claim 15, further comprising:
   detecting a cueing message, associated with the break, in the media stream,
      where the cueing message is provided a threshold period of time before the break is to occur.

19. The method of claim 15, further comprising:
   allocating the supplemental content stream prior to a beginning of the break of the media stream.

20. The method of claim 15, where the notification including the information that enables the media client to access the supplemental content stream is a first notification; and
   the method further comprising:
      sending a second notification to the media client to switch back to the media stream after the break.

* * * * *